United States Patent
Kasazumi et al.

(10) Patent No.: US 12,546,999 B2
(45) Date of Patent: Feb. 10, 2026

(54) LIGHT GUIDE PLATE AND DISPLAY DEVICE

(71) Applicant: Panasonic Intellectual Property Management Co., Ltd., Osaka (JP)

(72) Inventors: Ken'ichi Kasazumi, Osaka (JP); Keiji Sugiyama, Kyoto (JP); Yukihiro Chokyu, Osaka (JP); Masafumi Sueyoshi, Kanagawa (JP); Kazuhiro Minami, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 292 days.

(21) Appl. No.: 18/375,305

(22) Filed: Sep. 29, 2023

(65) Prior Publication Data
US 2024/0027762 A1    Jan. 25, 2024

Related U.S. Application Data

(63) Continuation of application No. PCT/JP2022/000019, filed on Jan. 4, 2022.

(30) Foreign Application Priority Data

Mar. 31, 2021    (JP) .................. 2021-060015

(51) Int. Cl.
    *G02B 27/01*    (2006.01)
    *B60K 35/23*    (2024.01)
    (Continued)

(52) U.S. Cl.
    CPC .......... *G02B 27/0103* (2013.01); *B60K 35/23* (2024.01); *B60K 35/60* (2024.01); *B60K 35/10* (2024.01); *G02B 2027/0105* (2013.01)

(58) Field of Classification Search
    None
    See application file for complete search history.

(56) References Cited

U.S. PATENT DOCUMENTS

| | | | |
|---|---|---|---|
| 2020/0209630 A1 | 7/2020 | Schultz et al. |
| 2022/0050232 A1 | 2/2022 | Schultz et al. |

(Continued)

FOREIGN PATENT DOCUMENTS

| | | |
|---|---|---|
| CN | 106773057 | 5/2017 |
| JP | 2020-112746 | 7/2020 |

(Continued)

OTHER PUBLICATIONS

International Search Report issued in International Pat. Appl. No. PCT/JP2022/000019, dated Mar. 29, 2022, along with an English translation thereof.

(Continued)

*Primary Examiner* — Derek S. Chapel
(74) *Attorney, Agent, or Firm* — Greenblum & Bernstein, P.L.C.

(57) ABSTRACT

A light guide plate includes a first hologram element including a plurality of diffraction cells. At least one of edge lines of one diffraction cell among the plurality of diffraction cells included in the first hologram element is located at a position other than on extensions of all edge lines of an adjacent diffraction cell adjacent to the one diffraction cell, the adjacent diffraction cell being included in the plurality of diffraction cells.

7 Claims, 5 Drawing Sheets

(51) Int. Cl.
    *B60K 35/60*     (2024.01)
    *B60K 35/10*     (2024.01)

(56) References Cited

U.S. PATENT DOCUMENTS

| | | | |
|---|---|---|---|
| 2022/0091421 A1 | 3/2022 | Kasegawa | |
| 2022/0214503 A1* | 7/2022 | Waldern | G02B 6/34 |
| 2024/0329398 A1* | 10/2024 | Imawaka | G02B 6/4206 |

FOREIGN PATENT DOCUMENTS

| | | |
|---|---|---|
| JP | 2020-523634 | 8/2020 |
| JP | 2021-033252 | 3/2021 |
| WO | 2018/231754 | 12/2018 |

OTHER PUBLICATIONS

Office Action issued in Corresponding JP Patent Application No. 2021-060015, dated May 28, 2024, along with an English translation thereof.

* cited by examiner

LIGHT GUIDE PLATE AND DISPLAY DEVICE

CROSS REFERENCE TO RELATED APPLICATION

This is a continuation application of PCT International Application No. PCT/JP2022/000019 filed on Jan. 4, 2022, designating the United States of America, which is based on and claims priority of Japanese Patent Application No. 2021-060015 filed on Mar. 31, 2021.

FIELD

The present disclosure relates to a light guide plate and a display device.

Background

An optical device that enables a displayed image to be displayed at a wide angle of view has been disclosed (see Patent Literature (PTL) 1). The optical device includes a plurality of hologram elements in a light guide plate.

CITATION LIST

Patent Literature

PTL 1: Japanese Unexamined Patent Application Publication No. 2020-112746

SUMMARY

However, the optical device disclosed in PTL 1 can be improved upon.

In view of this, the present disclosure provides a light guide plate, and so on, capable of improving upon the above related art.

A light guide plate according to an aspect of the present disclosure includes a first hologram element including a plurality of diffraction cells, wherein at least one of edge lines of one diffraction cell among the plurality of diffraction cells included in the first hologram element is located at a position other than on extensions of all edge lines of an adjacent diffraction cell adjacent to the one diffraction cell, the adjacent diffraction cell being included in the plurality of diffraction cells.

A light guide plate, and so on, according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS (Underlying Knowledge Forming Basis of the Present Disclosure)

There is a display device that projects an image onto a transparent plate such as a windshield of a vehicle (in Japan, generally called a front glass), allowing a user such as a driver to visually check the image together with a view beyond the transparent plate. Such a display device is also generally called a head-up display device.

Figure 1:
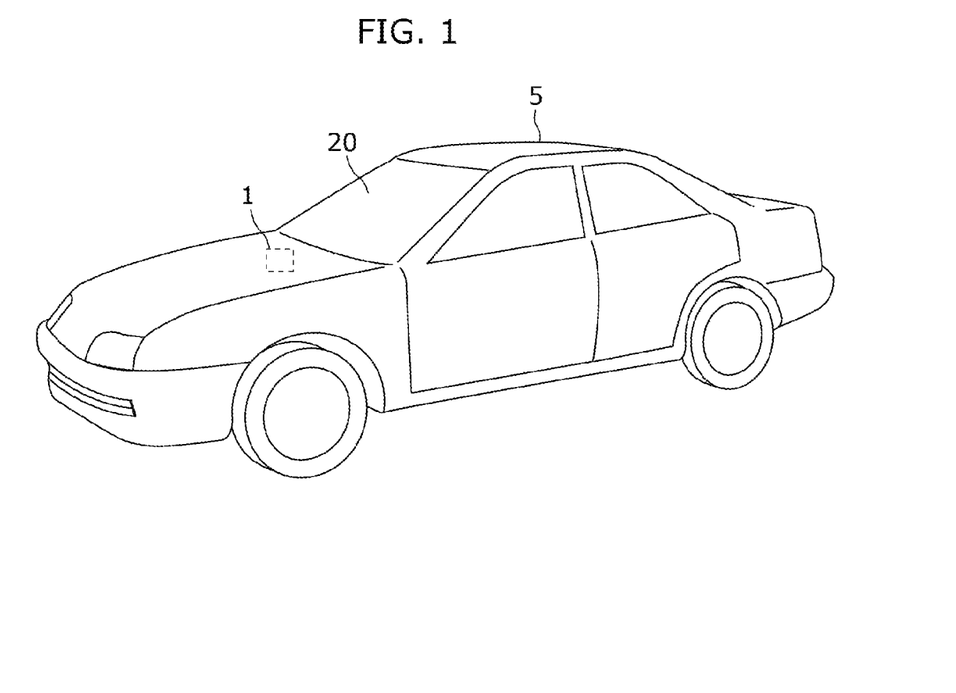
FIG. 1 is a schematic diagram illustrating an example of a vehicle in which a display device according to an embodiment is provided.
Figure 2:
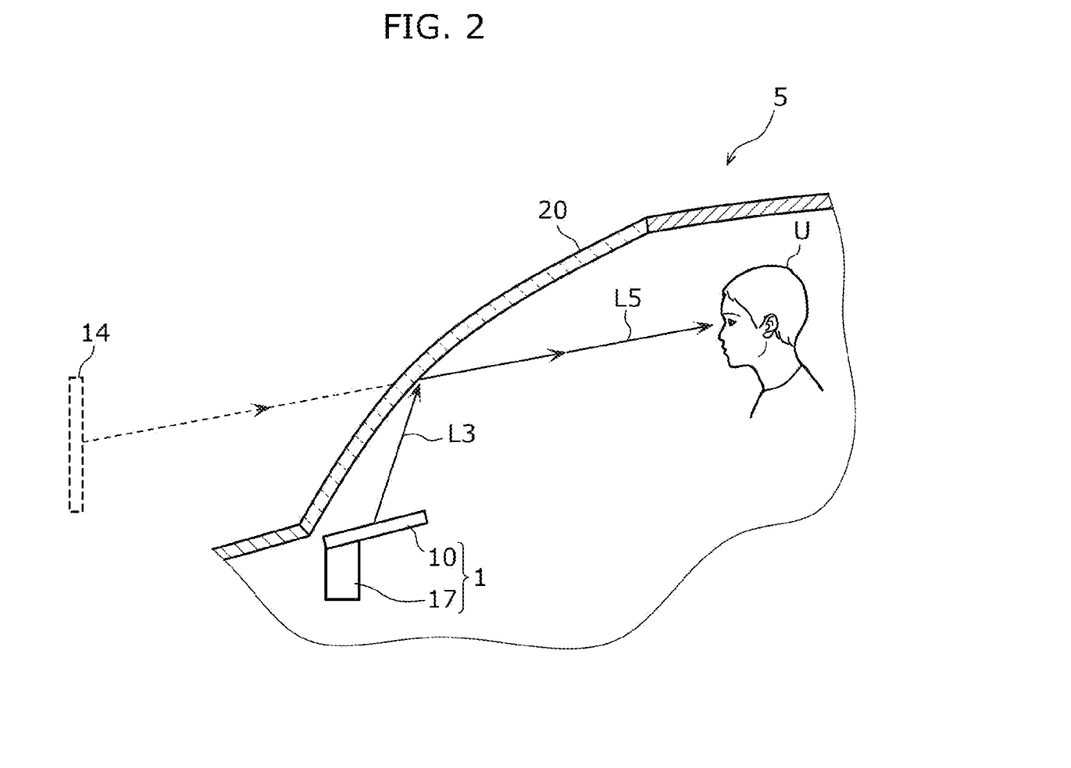
FIG. 2 is a schematic diagram illustrating a configuration of the display device.

FIG. 1 is a schematic diagram illustrating vehicle 5, an example of a vehicle in which display device 1 is provided. FIG. 2 is a schematic diagram illustrating a configuration of display device 1.

As illustrated in FIG. 1, vehicle 5 includes display device 1 and windshield 20. Display device 1 is provided, for example, below windshield 20 and emits light for displaying an image (also referred to as display light) upward, that is, toward windshield 20. Display device 1 is provided, for example, in the inside of a dashboard. An optical path of the display light emitted by display device 1 is secured. In other words, the emitted display light reaches windshield 20 without being blocked. A configuration of display device 1 will be described more in detail.

As illustrated in FIG. 2, display device 1 includes light guide plate 10 and image generating device 17.

Image generating device 17 is a device that generates display light and provides the display light to light guide plate 10. For example, image generating device 17 generates the display light by applying, to an image forming element such as liquid crystal, light that is emitted from a light source (not illustrated) included in image generating device 17. Image generating device 17 emits the generated display light toward light guide plate 10.

Light guide plate 10 is a plate body that deflects the display light generated by image generating device 17 while enlarging a beam width of the display light. Here, the beam width means a width of the beam in a direction perpendicular to a traveling direction of light.

The display light generated by image generating device 17 enters light guide plate 10. The display light entering is guided in the inside of light guide plate 10 and emitted to the outside of light guide plate 10 as light L3. Light L3 is reflected by windshield 20, turns into light L5, and enters the eyes of user U. Light guide plate 10 is provided in such a position and an attitude that light L3 is emitted toward windshield 20.

The enlargement and deflection of the beam width of the display light by light guide plate 10 are performed with a plurality of diffracting elements included in light guide plate 10. Accordingly, the plurality of diffracting elements included in light guide plate 10 each have diffraction properties causing diffraction of the display light in an appropriate direction and each have appropriate dimensions.

With light L5, which is the display light, entering the eyes, user U visually checks an image generated by image generating device 17. User U recognizes the image that is visually checked with light L5 being the display light as virtual image 14 that is positioned beyond windshield 20.

The above-described functions that light guide plate 10 has can be implemented with optical components such as a concave mirror. However, using light guide plate 10 has an advantage of reducing dimensions of display device 1 compared with the implementation with the optical components such as a concave mirror. Since display device 1 is provided in, for example, the inside of a dashboard of vehicle 5, reducing the dimension has an advantage of increasing flexibility of the provision.

However, using light guide plate 10 may deteriorate quality of an image to be displayed. Specifically, if arrangement of diffraction cells included in a plurality of diffracting elements included in light guide plate 10 is inappropriate, displacements or noise light beams may occur in a straight line in an image displayed by display device 1 and may be recognized by a user as deterioration of quality of the image.

In view of this, the present disclosure has as an object to provide a light guide plate that reduces degradation of quality of an image to be displayed.

A light guide plate according to an aspect of the present disclosure includes a first hologram element including a plurality of diffraction cells. Here, at least one of edge lines of one diffraction cell among the plurality of diffraction cells included in the first hologram element is located at a position other than on extensions of all edge lines of an adjacent diffraction cell adjacent to the one diffraction cell, the adjacent diffraction cell being included in the plurality of diffraction cells.

According to the above-described aspect, since at least one of edge lines of a diffraction cell included in the first hologram element of the light guide plate is at a position other than on extensions of edge lines of adjacent diffraction cells, edge lines of diffraction cells may be prevented from being present ranging in a straight line over a plurality of diffraction cells. Accordingly, displacements or noise light beams in a displayed image may be prevented from occurring in a straight line. In this manner, the light guide plate may be able to reduce deterioration of quality of an image to be displayed.

Furthermore, each of the plurality of diffraction cells included in the first hologram element may be in a shape of a polygon and may be positioned to share an edge line with an adjacent diffraction cell adjacent to the diffraction cell, the adjacent diffraction cell being included in the plurality of diffraction cells.

According to the above-described aspect, the first hologram element of the light guide plate includes a plurality of diffraction cells that are polygonal in shape. It may be possible to easily create the first hologram element including such a plurality of diffraction cells, using a method that utilizes step-and-repeat exposure, for example. Therefore, the light guide plate may possibly be created more easily, and it may be able to reduce deterioration of quality of an image to be displayed.

Furthermore, each of the plurality of diffraction cells included in the first hologram element may be in a shape of a regular hexagon.

According to the above-described aspect, since the first hologram element of the light guide plate includes diffraction cells each in a shape of a regular hexagon, presence of edge lines of diffraction cells ranging in a straight line over a plurality of diffraction cells may be avoided. Accordingly, occurrence of displacements or noise light beams in a straight line in a displayed image may be avoided. Furthermore, a length of the edge line per unit area can be shortened. Thus, a total amount of the displacements or noise light beams that occur in the displayed image may be decreased. Furthermore, for example, in the case where the first hologram element is created by a method that utilizes step-and-repeat exposure, the number of exposures can be decreased, which may contribute to improvement of efficiency in creating the first hologram element. Therefore, the light guide plate may be able to further reduce deterioration of quality of an image to be displayed while improving efficiency in creating the hologram element.

Furthermore, each of the plurality of diffraction cells included in the first hologram element may be in a shape of a square.

According to the above-described aspect, since the first hologram element of the light guide plate includes diffraction cells each in a shape of a square, edge lines of diffraction cells may be prevented from being present ranging in a straight line over a plurality of diffraction cells. At this time, in the case where there are a plurality of diffraction cells that have edge lines in the same straight line, edge lines of the diffraction cells may range in a straight line over the plurality of diffraction cells in a direction in which the diffraction cells are lined up, but in directions other than the above-described direction in which the diffraction cells are lined up, presence of edge lines that are present ranging in a straight line over a plurality of diffraction cells may be avoided. Accordingly, the light guide plate may be able to further reduce deterioration of quality of an image to be displayed.

Furthermore, each of the plurality of diffraction cells included in the first hologram element may be in a shape of an equilateral triangle.

According to the above-described aspect, since the first hologram element of the light guide plate includes diffraction cells each in a shape of an equilateral triangle, edge lines of diffraction cells may be prevented from being present ranging in a straight line over a plurality of diffraction cells. At this time, in the case where there are a plurality of diffraction cells that have edge lines in the same straight line, edge lines of the diffraction cells may range in a straight line over the plurality of diffraction cells in a direction in which the diffraction cells are lined up, but in directions other than the above-described direction in which the diffraction cells are lined up, presence of edge lines that are present ranging in a straight line over a plurality of diffraction cells may be avoided. Accordingly, the light guide plate may be able to further reduce deterioration of quality of an image to be displayed.

Furthermore, the light guide plate may further include a second hologram element including a plurality of diffraction cells, and all edge lines of one diffraction cell among the plurality of diffraction cells included in the second hologram element may be located on extensions of edge lines of adjacent diffraction cells adjacent to the one diffraction cell, the adjacent diffraction cells being included in the plurality of diffraction cells included in the second hologram element.

According to the above-described aspect, since all edge lines of a diffraction cell included in the second hologram element of the light guide plate are located on extensions of edge lines of adjacent diffraction cells, the second hologram element may be easy to create. Furthermore, precision of interference fringes formed on the second hologram element can be improved, which may contribute to improvement of quality of an image to be displayed. In this manner, the light guide plate may be able to reduce deterioration of quality of an image to be displayed while making the hologram element easier to create.

Furthermore, each of the plurality of diffraction cells included in the second hologram element may be in a shape of a square and may be positioned to share an edge line with an adjacent diffraction cell adjacent to the diffraction cell, the adjacent diffraction cell being included in the plurality of diffraction cells included in the second hologram element.

According to the above-described aspect, the second hologram element of the light guide plate includes a plurality of diffraction cells that are square shaped. It may be possible to easily create the second hologram element including such a plurality of diffraction cells, using a method that utilizes step-and-repeat exposure, for example. Therefore, the light guide plate may be able to more easily reduce deterioration of quality of an image to be displayed.

Furthermore, the first hologram element may be positioned to cause light that has propagated in an inside of the light guide plate to be emitted to an outside of the light guide plate by deflection through diffraction.

According to the above-described aspect, the first hologram element of the light guide plate may be able to cause the light that has propagated in the inside of the light guide plate to be emitted to the outside of the light guide plate by deflection through diffraction. Therefore, the light guide plate may be able to emit the light to the outside of the light guide plate by way of the diffraction by the first hologram element.

Furthermore, the second hologram element may be positioned to cause light that has entered from an outside to an inside of the light guide plate to propagate in the inside of the light guide plate by deflection through diffraction.

According to the above-described aspect, the second hologram element of the light guide plate may be able to cause the light that has entered from the outside to the inside of the light guide plate to propagate in the inside of the light guide plate by deflection through diffraction. Therefore, the light guide plate may be able to cause light to propagate in the inside of the light guide plate by way of the diffraction by the second hologram element.

Furthermore, the first hologram element may be an emission-side hologram element, and the second hologram element may comprise two second hologram elements which are an entrance-side hologram element and a deflecting hologram element. Here, the entrance-side hologram element may be positioned to cause light that has entered from an outside to an inside of the light guide plate to propagate in the inside of the light guide plate by deflection through diffraction, the deflecting hologram element may be positioned to cause the light deflected by the entrance-side hologram element to propagate in the inside of the light guide plate by deflection through diffraction, and the emission-side hologram element may be positioned to cause the light deflected by the deflecting hologram element to be emitted to the outside of the light guide plate by deflection through diffraction.

According to the above-described aspect, the light guide plate may be able to more appropriately reduce deterioration of quality of an image to be displayed, by using one first hologram element as an emission-side hologram element and using two second hologram elements as an entrance-side hologram element and a deflecting hologram element.

Furthermore, a display device according to an aspect of the present disclosure is a display device that includes: the above-described light guide plate; and an image generating device that generates light showing an image, and causes the light to enter the light guide plate.

According to this aspect, it may be possible to reduce deterioration of quality of an image to be displayed, by using the light guide plate.

Hereinafter, exemplary embodiments will be described in detail with reference to the Drawings.

It should be noted that each of the exemplary embodiments described hereinafter shows a general or specific example. Numerical values, shapes, materials, structural components, the arrangement and connection of the structural components, steps, the processing order of the steps, and so on, are mere examples, and thus are not intended to limit the present disclosure. Furthermore, among the structural components described in the following embodiments, structural components not recited in any one of the independent claims that indicate the broadest concepts are described as optional structural components.

EMBODIMENT

A light guide plate and a display device that reduce degradation of quality of an image to be displayed will be described in the present embodiment. A light guide plate and a display device in the present embodiment form a display device that displays an image on a windshield of a vehicle by projecting the image onto the windshield. Hereinafter, the description may be made with XYZ axes illustrated in figures.

Figure 3:
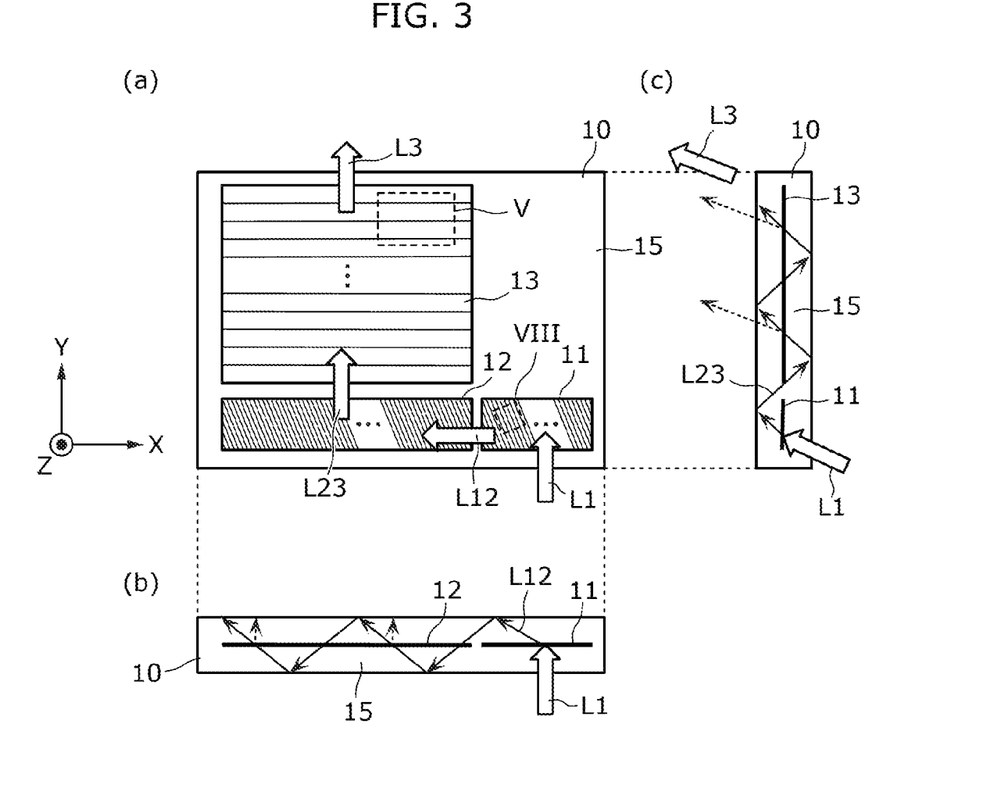
FIG. 3 is a schematic diagram illustrating a configuration of a light guide plate according to the embodiment.

FIG. 3 is a schematic diagram illustrating a configuration of light guide plate 10 according to the present embodiment. In FIG. 3, (a) is a diagram illustrating a configuration of light guide plate 10 in a plan view, that is, as viewed from a Z-axis positive direction. In FIG. 3, (b) is a diagram illustrating a configuration of light guide plate 10 in a side view, that is, as viewed from a Y-axis negative direction. In FIG. 3, (c) is a diagram illustrating a configuration of light guide plate 10 in a side view, that is, as viewed from an X-axis positive direction.

As illustrated in FIG. 3, light guide plate 10 includes transparent component 15 and includes, in the inside or surface of transparent component 15, hologram elements 11, 12, and 13 (also referred to as hologram element 11 and the like). Light guide plate guides, in the inside of light guide plate 10 by total reflection, light L1 that has entered. Light guide plate 10 emits, to the outside of light guide plate 10, light that is subjected to deflection through diffraction by hologram elements 11, 12, and 13 as light L3. Transparent component 15 is made of glass, resin, or the like.

Light L1 that enters light guide plate 10 is light that travels in a Y-axis positive direction and the Z-axis positive direction. Light L1 is assumed to be display light generated by image generating device 17. In a state of using display device 1 (i.e., in a state where display device 1 is provided as illustrated in FIG. 2), light guide plate 10 is provided in such a position and an attitude that light L1 enters at an appropriate angle illustrated in FIG. 3.

Hologram element 11 is a diffracting element that is disposed inside or on the surface of light guide plate 10. Hologram element 11 causes light L1 entering the inside of light guide plate 10 from the outside of light guide plate 10 to propagate in the inside of light guide plate 10 by deflection through diffraction. Hologram element 11 is formed with interference fringes that are straight in a plan view and causes diffraction with the interference fringes to deflect light L1, thus forming light L12. Light L12 is light that travels in an X-axis negative direction. Light L12 propagates in the inside of light guide plate 10 in the X-axis negative direction, repeating total reflection at interfaces between transparent component 15 and the air.

The interference fringes formed on hologram element 11 are interference fringes that deflect light L1 in such a manner that light L12 undergoes the total reflection at the interfaces between transparent component 15 and the air. Specifically, the interference fringes deflect light L1 in such a manner as to maintain a state where an angle of incidence of light L12 with respect to the interface is larger than a critical angle.

Hologram element 12 is a diffracting element that is disposed inside or on the surface of light guide plate 10. Hologram element 12 causes light L12 deflected by hologram element 11 to propagate in the inside of light guide plate 10 by deflection through diffraction. Hologram element 12 is formed with interference fringes that are straight in a plan view and causes diffraction with the interference fringes to deflect light L12, thus forming light L23. Light L23 is light that travels in the Y-axis positive direction. Light L23 propagates in the inside of light guide plate 10 in the Y-axis positive direction, repeating total reflection at interfaces between transparent component 15 and the air.

The interference fringes formed on hologram element 12 are interference fringes that deflect light L12 in such a manner that light L23 undergoes the total reflection at the interfaces between transparent component 15 and the air. Specifically, the interference fringes deflect light L12 in such a manner as to maintain a state where an angle of incidence of light L23 with respect to the interface is larger than a critical angle.

Hologram element 13 is a diffracting element that is disposed inside or on the surface of light guide plate 10. hologram element 13 causes light L23 deflected by hologram element 12 to be emitted to the outside of light guide plate 10 by deflection through diffraction. Hologram element 13 is formed with interference fringes that are straight in a plan view and causes diffraction with the interference fringes to deflect light L23, thus forming light L3. Light L3 is light that travels in the Y-axis positive direction and the Z-axis positive direction.

The interference fringes formed on hologram element 13 are interference fringes that deflect light L23 in such a manner that light L3 is emitted from light guide plate 10 rather than undergoing total reflection at the interfaces between transparent component 15 and the air. Specifically, the interference fringes deflect light L23 in such a manner as to maintain a state where an angle of incidence of light L3 with respect to the interface is larger than a critical angle.

Hologram element 11 will be also referred to as an entrance-side hologram element. Hologram element 12 will be also referred to as a deflecting hologram element. Hologram element 13 will be also referred to as an emission-side hologram element.

In the state of using display device 1, light guide plate 10 is provided in such a position and an attitude that light L3 is emitted toward windshield 20. After being emitted from light guide plate 10, light L3 is reflected by windshield 20 and enters the eyes of user U.

Features of diffraction cells included in hologram element 11 and the like will be described. A diffraction cell is a region where diffraction properties are the same. In one diffraction cell, interference fringes having a predetermined pattern are formed. With the formed interference fringes, hologram element 11 and the like diffract light.

Hologram element 11 and the like each include two or more diffraction cells. At a boundary between adjacent diffraction cells of the two or more diffraction cells, a displacement between patterns of interference fringes and a noise light beam may occur. The displacement between patterns of interference fringes causes a deviation of an optical path of diffracted light. As a result, in an image to be displayed by the light (also referred to as a displayed image), degradation of the displayed image is caused by occurrence of displacements or noise light beams corresponding to a shape of an edge line of a diffraction cell. The displacements or noise light beams in the displayed image have the property of being difficult for user U to recognize when being present scattered over the displayed image and being easy for user U to recognize when, for example, being present ranging in a straight line.

Here, the edge line of a diffraction cell is a line that indicates an edge of the diffraction cell. In the case where a diffraction cell is disposed adjacent to a next diffraction cell without a gap, these diffraction cells share an edge line. In this case, the edge line matches a boundary line that indicates a boundary between the diffraction cells adjacent to each other.

Hologram element 13 has the following features about an edge line of a diffraction cell.

That is, at least one of edge lines of one diffraction cell among the plurality of diffraction cells included in hologram element 13 (corresponding to a first hologram element) is located at a position other than on extensions of all edge lines of an adjacent diffraction cell adjacent to the one diffraction cell.

Accordingly, edge lines can be prevented from being present ranging in a straight line over a plurality of diffraction cells. Then, displacements in a displayed image resulting from displacements between patterns of interference fringes at boundaries of diffraction cells are prevented from being present ranging in a straight line in the displayed image. As a result, displacements or noise light beams in a displayed image become difficult for user U to recognize.

Each of a plurality of diffraction cells included in hologram element 13 is, for example, in a shape of a polygon and is positioned to share an edge line with an adjacent diffraction cell. In this case, each of sides included in the polygonal shape corresponds to an edge line.

The polygonal shape may be, for example, a hexagonal shape or a regular hexagonal shape. The polygonal shape may be, for example, a quadrilateral shape or a square shape. The polygonal shape may be, for example, a triangular shape or an equilateral triangular shape. A specific example of a shape and an arrangement pattern of a diffraction cell in a shape of a polygon will be described later.

Hologram element 11 or 12 may have the following features about an edge line of a diffraction cell.

That is, all edge lines of one diffraction cell among the plurality of diffraction cells included in hologram element 11 or 12 (corresponding to a second hologram element) may be located on extensions of edge lines of adjacent diffraction cells. Each of a plurality of diffraction cells included in hologram element 11 or 12 may be, for example, in a shape of a quadrilateral and may be positioned to share an edge line with an adjacent diffraction cell. This provides an advantage that creation of hologram element 11 or 12 by step-and-repeat exposure (described later) becomes easy.

As a method of creating a hologram element, a creating method involving step-and-repeat exposure will be described below.

Figure 4:
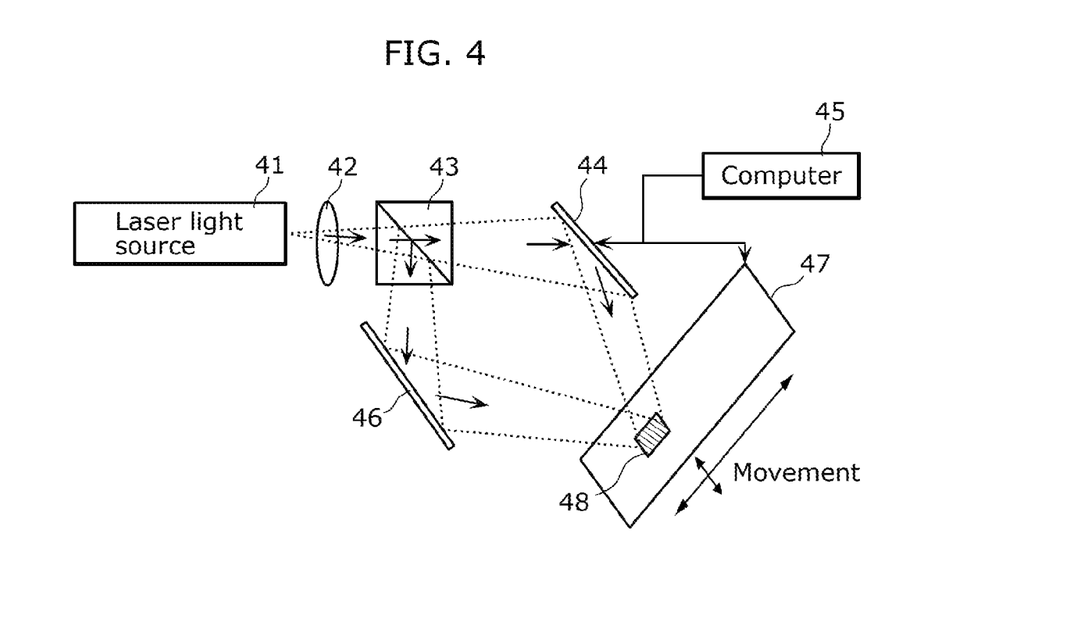
FIG. 4 is a diagram for describing an example of a method of creating a hologram element according to the embodiment.

FIG. 4 is a diagram for describing an example of a method of creating hologram element 11 and the like according to the present embodiment.

In the creating method involving step-and-repeat exposure, a plurality of regions into which photo-sensitive member 47 is divided are each formed with interference fringes one by one. On one target region 48 selected from among the plurality of regions, interference fringes are formed by one-time exposure to light. A plurality of regions included in photo-sensitive member 47 are selected as target regions 48 and formed with interference fringes by exposure region by region. As a result, the entire surface of photo-sensitive member 47 is formed with interference fringes.

Computer 45 selects one target region 48 from among the plurality of regions included in photo-sensitive member 47. Computer 45 forms an image indicating a pattern of interference fringes to be formed on target region 48 selected on a liquid crystal on silicon (LCOS) element 44, which is a reflective liquid crystal element. Computer 45 also performs parallel movement on photo-sensitive member 47 such that light reflected by LCOS element 44 and light reflected by planar mirror 46 are applied to target region 48.

Light emitted from laser light source 41 reaches beam splitter 43 via lens 42. The light that is transmitted by beam splitter 43 is reflected by LCOS element 44 to reach target region 48 of photo-sensitive member 47. LCOS element 44 is formed with the image indicating the pattern of interference fringes to be formed on target region 48, by computer 45. The light that is reflected by LCOS element 44 includes the image indicating the pattern of interference fringes. The light that is reflected by beam splitter 43 is reflected by planar mirror 46 to reach target region 48 of photo-sensitive member 47.

In target region 48, interference fringes that are produced by interference between the light reflected by LCOS element 44 and the light reflected by planar mirror 46 are recorded. By performing the process of recording interference fringes in one target region 48 on all of the plurality of regions of photo-sensitive member 47 one by one, a plurality of diffraction cells are formed on the entire surface of photo-sensitive member 47. Photo-sensitive member 47 recording the interference fringes in this manner is created as a hologram element.

In the method involving step-and-repeat exposure, the plurality of diffraction cells are formed on the entire surface of photo-sensitive member 47. Thus, a displacement between sets of interference fringes occurs at a boundary between the diffraction cells. The displacement between sets of interference fringes causes a deviation of an optical path of diffracted light, resulting in degradation of a displayed image based on the light.

A shape and an arrangement pattern of a diffraction cell included in hologram element 13 will be described below specifically.

Figure 5:
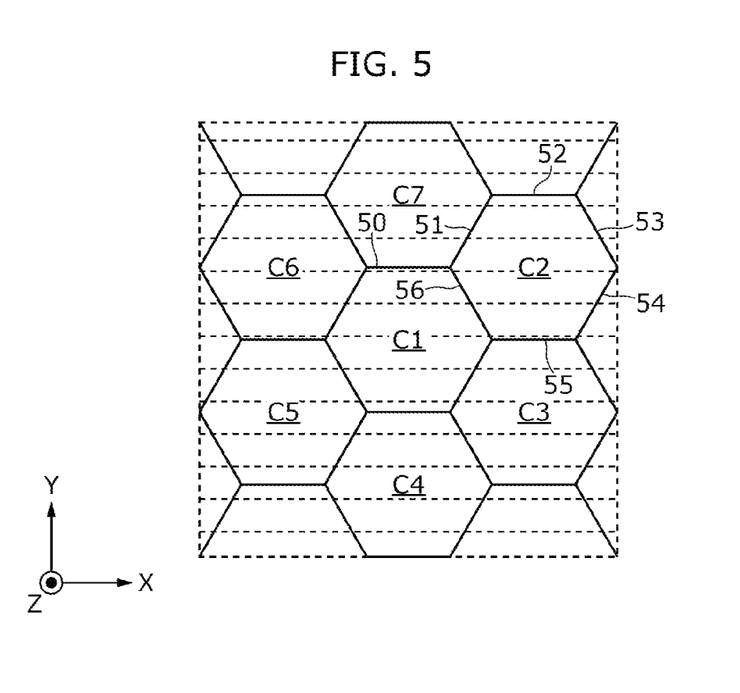
FIG. 5 is a diagram for describing a first example of the shape and arrangement pattern of diffraction cells according to the embodiment.

FIG. 5 is a diagram for describing a first example of the shape and arrangement pattern of diffraction cells according to the embodiment. FIG. 5 illustrates in detail an example of the inside of dashed box V illustrated in FIG. 3.

Diffraction cells illustrated in FIG. 5 are an example of diffraction cells included in hologram element 13 and are each in a shape of a regular hexagon. The arrangement pattern of diffraction cells as illustrated in FIG. 5 is an arrangement pattern in which a plane is filled with regular hexagons without gaps. The arrangement pattern can be called a honeycomb pattern.

The description will be given with attention paid to diffraction cell C1, which is one of the diffraction cells illustrated in FIG. 5. Note that the description holds true for the other diffraction cells illustrated in FIG. 5.

Diffraction cells adjacent to diffraction cell C1 are diffraction cells C2, C3, C4, C5, C6, and C7. Here, "being adjacent" means sharing at least one of sides or vertices with a diffraction cell to which attention is paid. Hereinafter, this holds true.

Side 50 of diffraction cell C1 is located at a position other than on extensions of all sides 51, 52, 53, 54, 55, and 56 of diffraction cell C2, which is one of the diffraction cells adjacent to diffraction cell C1. In other words, side 50 is located on none of extensions of sides 51, 52, 53, 54, 55, and 56.

Likewise, side 50 of diffraction cell C1 is located at a position other than on extensions of all sides of diffraction cells C3, C4, C5, C6, and C7, which are the other diffraction cells adjacent to diffraction cell C1.

By disposing diffraction cells included in hologram element 13 in the arrangement pattern illustrated in FIG. 5, edge lines of diffraction cells are prevented from being present ranging in a straight line over a plurality of diffraction cells. Accordingly, displacements or noise light beams in a displayed image are prevented from occurring, ranging in a straight line.

By disposing diffraction cells included in hologram element 13 in the arrangement pattern illustrated in FIG. 5, a total amount of the displacements or noise light beams that occur in the displayed image can be decreased. This is because displacing regular-hexagonal diffraction cells in the arrangement pattern illustrated in FIG. 5 can decrease a total length of edge lines per unit area. This is based on the fact that in the case where a plane is covered with congruent polygons, a circumferential length of the polygon to an area of the polygon is minimized when regular hexagons are used as the polygons.

Disposing diffraction cells included in hologram element 13 in the arrangement pattern illustrated in FIG. 5 can contribute to reducing the number of exposures in the case where hologram element 13 is created by step-and-repeat exposure. An effective field of view of a lens used in step-and-repeat exposure typically in a shape of a circle when viewed in cross section perpendicular to a traveling direction of light. In the case where an area of a target region to be exposed in one exposure is to be maximized, setting a region in a shape close to a circle as the target region is effective. Thus, the number of exposures can be minimized in the case of forming diffraction cells each in a shape of a regular hexagon, which is a shape the closest to a circle of polygons with which a plane can be filled without gaps.

Note that the description holds true for not only the arrangement pattern illustrated in FIG. 5 but also an arrangement pattern that is the arrangement pattern illustrated in FIG. 5 enlarged or reduced (i.e., subjected to linear transformation) in any direction.

Figure 6:
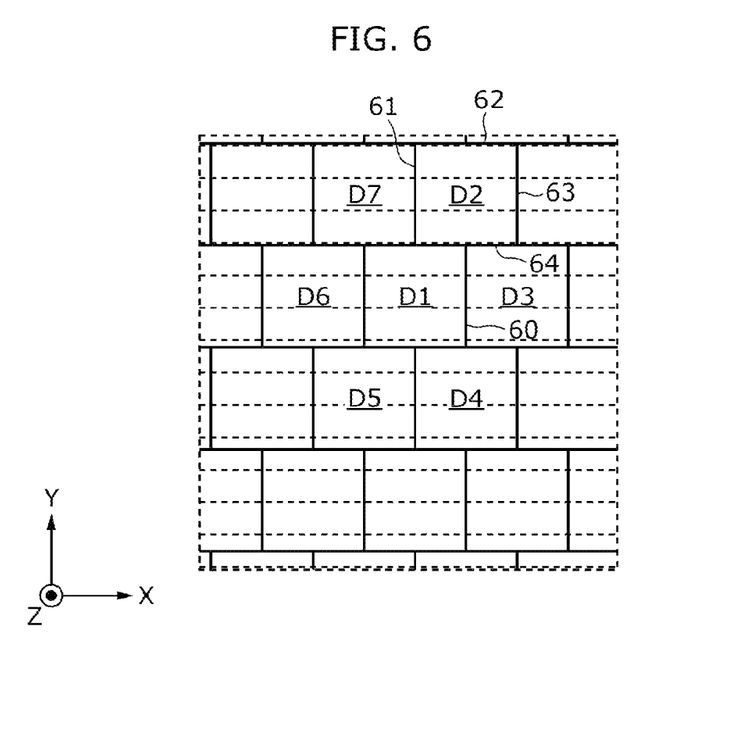
FIG. 6 is a diagram for describing a second example of the shape and arrangement pattern of diffraction cells according to the embodiment.

FIG. 6 is a diagram for describing a second example of the shape and arrangement pattern of diffraction cells according to the embodiment. FIG. 6 illustrates in detail an example of the inside of dashed box V illustrated in FIG. 3.

Diffraction cells illustrated in FIG. 6 are an example of diffraction cells included in hologram element 13 and are each in a shape of a square. The arrangement pattern of diffraction cells as illustrated in FIG. 6 is an arrangement pattern made by shifting adjacent rows (or columns) of an arrangement pattern in which a plane is filled with squares in a grid pattern. The arrangement pattern can be called a brick laying pattern.

The description will be given with attention paid to diffraction cell D1, which is one of the diffraction cells illustrated in FIG. 6. Note that the description holds true for the other diffraction cells illustrated in FIG. 6.

Diffraction cells adjacent to diffraction cell D1 are diffraction cells D2, D3, D4, D5, D6, and D7.

Side 60 of diffraction cell D1 is located at a position other than on extensions of all sides 61, 62, 63, and 64 of diffraction cell D2, which is one of the diffraction cells adjacent to diffraction cell D1. In other words, side 60 is located on none of extensions of sides 61, 62, 63, and 64.

Likewise, side 60 of diffraction cell D1 is located at a position other than on extensions of all sides of diffraction cells D3, D4, D5, D6, and D7, which are the other diffraction cells adjacent to diffraction cell D1.

By disposing diffraction cells included in hologram element 13 in the arrangement pattern illustrated in FIG. 6, edge lines of diffraction cells are prevented from being present ranging in a straight line over a plurality of diffraction cells. Accordingly, displacements in a displayed image are prevented from occurring, ranging in a straight line.

In the arrangement pattern illustrated in FIG. 6, edge lines of diffraction cells are present ranging in a straight line over a plurality of diffraction cells in a direction parallel to an X axis, but in directions other than the above-described direction, presence of edge lines of diffraction cells ranging in a straight line over a plurality of diffraction cells is avoided.

Note that the description holds true for not only the arrangement pattern illustrated in FIG. 6 but also an arrangement pattern that is the arrangement pattern illustrated in FIG. 6 enlarged or reduced (i.e., subjected to linear transformation) in any direction.

Figure 7:
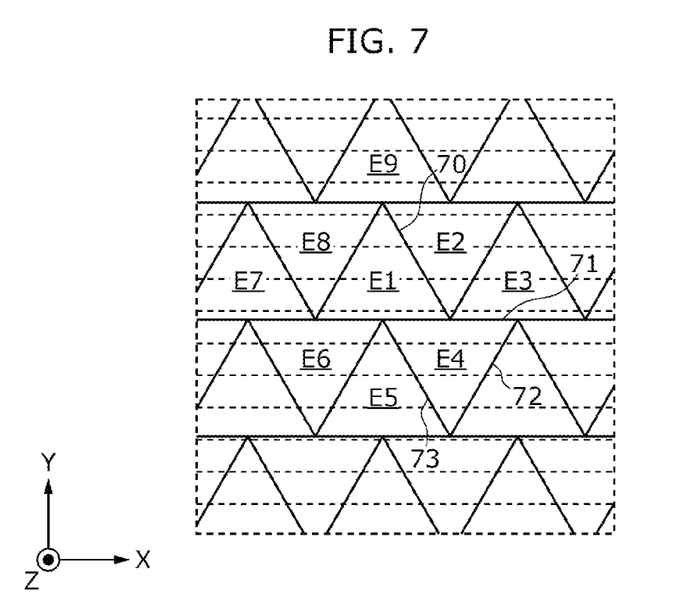
FIG. 7 is a diagram for describing a third example of the shape and arrangement pattern of diffraction cells according to the embodiment.

FIG. 7 is a diagram for describing a third example of the shape and arrangement pattern of diffraction cells according to the present embodiment. FIG. 7 illustrates in detail an example of the inside of dashed box V illustrated in FIG. 3.

Diffraction cells illustrated in FIG. 7 are an example of diffraction cells included in hologram element 13 and are each in a shape of an equilateral triangle.

The description will be given with attention paid to diffraction cell E1, which is one of the diffraction cells illustrated in FIG. 7. Note that the description holds true for the other diffraction cells illustrated in FIG. 7.

Diffraction cells adjacent to diffraction cell E1 are diffraction cells E2, E3, E4, E5, E6, E7, E8, and E9.

Then, side 70 of diffraction cell E1 is located at a position other than on extensions of all sides 71, 72, and 73 of diffraction cell E4, which is one of the diffraction cells adjacent to diffraction cell E1. In other words, side 70 is located on none of extensions of sides 71, 72, and 73.

Likewise, side 70 of diffraction cell E1 is located at a position other than on extensions of all sides of diffraction cells E2, E3, E5, E6, E7, E8, and E9, which are the other diffraction cells adjacent to diffraction cell E1. Note that determination as to whether side 70 is located on an extension excludes sides that match side 70 in length and position. This is because sides that match side 70 in length and position do not cause an additional displacement in a displayed image resulting from a displacement between patterns of interference fringes at the side.

By disposing diffraction cells included in hologram element 13 in the arrangement pattern illustrated in FIG. 7, edge lines of diffraction cells are prevented from being present ranging in a straight line over a plurality of diffraction cells. Accordingly, displacements in a displayed image are prevented from occurring, ranging in a straight line.

In the arrangement pattern illustrated in FIG. 7, as in the case of FIG. 6, edge lines of diffraction cells are present ranging in a straight line over a plurality of diffraction cells in a direction parallel to an X axis, but in directions other than the above-described direction, presence of edge lines of diffraction cells ranging in a straight line over a plurality of diffraction cells is avoided.

Note that the description holds true for not only the arrangement pattern illustrated in FIG. 7 but also an arrangement pattern that is the arrangement pattern illustrated in FIG. 7 enlarged or reduced (i.e., subjected to linear transformation) in any direction.

A specific shape and a specific arrangement of diffraction cells included in hologram element 11 or 12 will be described below.

Figure 8:
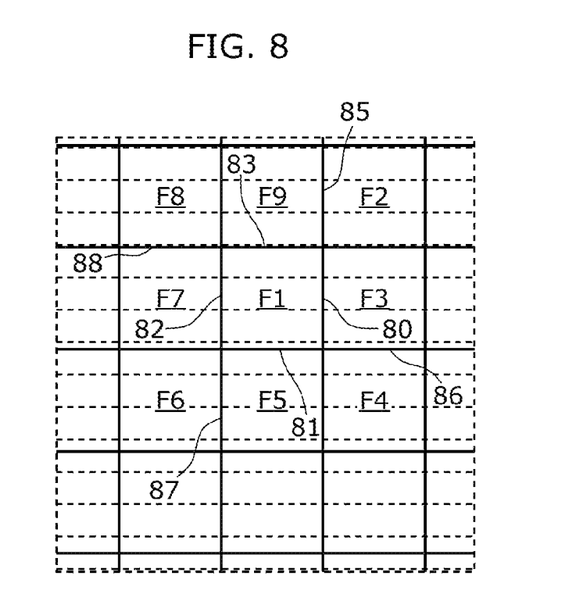
FIG. 8 is a diagram for describing a fourth example of the shape and arrangement pattern of diffraction cells according to the embodiment.

FIG. 8 is a diagram for describing a fourth example of the shape and arrangement pattern of diffraction cells according to the present embodiment. FIG. 8 illustrates in detail an example of the inside of dashed box VIII illustrated in FIG. 3.

Diffraction cells illustrated in FIG. 8 are an example of diffraction cells included in hologram element 11 or 12 and are each in a shape of a square.

The description will be given with attention paid to diffraction cell F1, which is one of the diffraction cells illustrated in FIG. 8. Note that the description holds true for the other diffraction cells illustrated in FIG. 8.

Diffraction cells adjacent to diffraction cell F1 are diffraction cells F2, F3, F4, F5, F6, F7, F8, and F9.

All sides 80, 81, 82, and 83 of diffraction cell F1 are located on extensions of edge lines of diffraction cells adjacent to diffraction cell F1. Specifically, side 80 of diffraction cell F1 is located on an extension of side 85 of diffraction cell F9 or F2, which is one of the diffraction cells adjacent to diffraction cell F1. Side 81 of diffraction cell F1 is located on an extension of side 86 of diffraction cell F3 or F4, which is one of the diffraction cells adjacent to diffraction cell F1. Side 82 of diffraction cell F1 is located on an extension of side 87 of diffraction cell F5 or F6, which is one of the diffraction cells adjacent to diffraction cell F1. Side 83 of diffraction cell F1 is located on an extension of side 88 of diffraction cell F7 or F8, which is one of the diffraction cells adjacent to diffraction cell F1.

Hologram element 11 or 12 having such an arrangement pattern is easy to create. Even in the case where displacements in a displayed image occur, ranging in a straight line in light emitted from the hologram element, the light emitted from the hologram element then propagates in the inside of hologram element 13, providing an effect of making the displacements in the displayed image inconspicuous. The effect can be considered to be an effect of making the displacements difficult for user U to recognize as degradation of quality of the displayed image.

Note that the description holds true for not only the arrangement pattern illustrated in FIG. 8 but also an arrangement pattern that is the arrangement pattern illustrated in FIG. 8 enlarged or reduced (i.e., subjected to linear transformation) in any direction.

Figure 9:
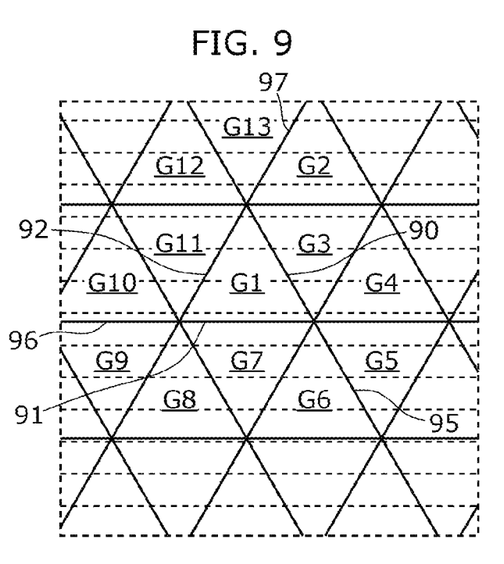
FIG. 9 is a diagram for describing a fifth example of the shape and arrangement pattern of diffraction cells according to the embodiment.

FIG. 9 is a diagram for describing a fifth example of the shape and arrangement pattern of diffraction cells according to the present embodiment. FIG. 9 illustrates in detail an example of the inside of dashed box VIII illustrated in FIG. 3.

Diffraction cells illustrated in FIG. 9 are an example of diffraction cells included in hologram element 11 or 12 and are each in a shape of a triangle.

The description will be given with attention paid to diffraction cell G1, which is one of the diffraction cells illustrated in FIG. 9. Note that the description holds true for the other diffraction cells illustrated in FIG. 9.

Diffraction cells adjacent to diffraction cell G1 are diffraction cells G2, G3, G4, G5, G6, G7, G8, G9, G10, G11, G12, and G13.

All sides 90, 91, and 92 of diffraction cell G1 are located on extensions of edge lines of diffraction cells adjacent to diffraction cell G1. Specifically, side 90 of diffraction cell G1 is located on an extension of side 95 of diffraction cell G5 or G6, which is one of the diffraction cells adjacent to diffraction cell G1. Side 91 of diffraction cell G1 is located on an extension of side 96 of diffraction cell G9 or G10, which is one of the diffraction cells adjacent to diffraction cell G1. Side 92 of diffraction cell G1 is located on an extension of side 97 of diffraction cell G13 or G2, which is one of the diffraction cells adjacent to diffraction cell G1.

Hologram element 11 or 12 having such an arrangement pattern is easy to create as in the case illustrated in FIG. 8, enabling improvement of precision of interference fringes formed, which can contribute to improvement of quality of an image to be displayed.

As described above, in the light guide plate according to the foregoing embodiment or variation, since at least one of edge lines of a diffraction cell included in the first hologram element of the light guide plate is at a position other than on extensions of edge lines of adjacent diffraction cells, edge lines of diffraction cells may be prevented from being present ranging in a straight line over a plurality of diffraction cells. Accordingly, displacements or noise light beams in a displayed image may be prevented from occurring in a straight line. In this manner, the light guide plate may be able to reduce deterioration of quality of an image to be displayed.

Furthermore, the first hologram element of the light guide plate includes a plurality of diffraction cells that are polygonal in shape. It may be possible to easily create the first hologram element including such a plurality of diffraction cells, using a method that utilizes step-and-repeat exposure, for example. Therefore, the light guide plate may be able to more easily reduce deterioration of quality of an image to be displayed.

Furthermore, since the first hologram element of the light guide plate includes diffraction cells each in a shape of a regular hexagon, presence of edge lines of diffraction cells ranging in a straight line over a plurality of diffraction cells may be avoided. Accordingly, occurrence of displacements or noise light beams in a straight line in a displayed image may be avoided. Furthermore, a length of the edge line per unit area can be shortened. Thus, a total amount of the displacements or noise light beams that occur in the displayed image may be decreased. Furthermore, for example, in the case where the first hologram element is created by a method that utilizes step-and-repeat exposure, the number of exposures can be decreased, which may contribute to improvement of efficiency in creating the first hologram element. Therefore, the light guide plate may be able to further reduce deterioration of quality of an image to be displayed while improving efficiency in creating the hologram element.

Furthermore, since the first hologram element of the light guide plate includes diffraction cells each in a shape of a square, edge lines of diffraction cells may be prevented from being present ranging in a straight line over a plurality of diffraction cells. At this time, in the case where there are a plurality of diffraction cells that have edge lines in the same straight line, edge lines of the diffraction cells may range in a straight line over the plurality of diffraction cells in a direction in which the diffraction cells are lined up, but in directions other than the above-described direction in which the diffraction cells are lined up, presence of edge lines that are present ranging in a straight line over a plurality of diffraction cells may be avoided. Accordingly, the light guide plate may be able to further reduce deterioration of quality of an image to be displayed.

Furthermore, since the first hologram element of the light guide plate includes diffraction cells each in a shape of an equilateral triangle, edge lines of diffraction cells may be prevented from being present ranging in a straight line over a plurality of diffraction cells. At this time, in the case where there are a plurality of diffraction cells that have edge lines in the same straight line, edge lines of the diffraction cells may range in a straight line over the plurality of diffraction cells in a direction in which the diffraction cells are lined up, but in directions other than the above-described direction in which the diffraction cells are lined up, presence of edge lines that are present ranging in a straight line over a plurality of diffraction cells may be avoided. Accordingly, the light guide plate may be able to further reduce deterioration of quality of an image to be displayed.

Furthermore, since all edge lines of a diffraction cell included in the second hologram element of the light guide plate are located on extensions of edge lines of adjacent diffraction cells, edge lines of a plurality of diffraction cells are present ranging in a straight line. Such a second hologram element is easy to create, enabling improvement of precision of interference fringes formed, which may contribute to improvement of quality of an image to be displayed. In this manner, the light guide plate may be able to reduce deterioration of quality of an image to be displayed while making the hologram element easier to create.

Furthermore, the second hologram element of the light guide plate includes a plurality of diffraction cells that are square shaped. It may be possible to easily create the second hologram element including such a plurality of diffraction cells, using a method that utilizes step-and-repeat exposure, for example. Therefore, the light guide plate may be able to more easily reduce deterioration of quality of an image to be displayed.

The first hologram element of the light guide plate may be able to cause the light that has propagated in the inside of the light guide plate to be emitted to the outside of the light guide plate by deflection through diffraction. Therefore, the light guide plate may be able to emit the light to the outside of the light guide plate by way of the diffraction by the first hologram element.

The second hologram element of the light guide plate may be able to cause the light that has entered from the outside to the inside of the light guide plate to propagate in the inside of the light guide plate by deflection through diffraction. Therefore, the light guide plate may be able to cause light to propagate in the inside of the light guide plate by way of the diffraction by the second hologram element.

The light guide plate may be able to more appropriately reduce deterioration of quality of an image to be displayed, by using one first hologram element as an emission-side hologram element and using two second hologram elements as an entrance-side hologram element and a deflecting hologram element.

Although a light guide plate, and so on, according to one or more aspects have been described thus far based on the foregoing exemplary embodiment, the present disclosure is not limited to the foregoing embodiments. Forms obtained by making various modifications to the foregoing embodiments that can be conceived by those skilled in the art, as well as forms realized by arbitrarily combining structural components in different embodiments, without departing from the essence of the present disclosure, may be included in the one or more aspects.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-060015 filed on Mar. 31, 2021 and PCT International Application No. PCT/JP2022/000019 filed on Jan. 4, 2022.

INDUSTRIAL APPLICABILITY

The present disclosure can be used in a head-up display device, and the like, of a vehicle.

The invention claimed is:

1. A light guide plate comprising:
a first hologram element including a plurality of diffraction cells; and
a second hologram element including a plurality of diffraction cells, wherein
at least one of edge lines of one diffraction cell among the plurality of diffraction cells included in the first hologram element is located at a position other than on extensions of all edge lines of an adjacent diffraction cell adjacent to the one diffraction cell, the adjacent diffraction cell being included in the plurality of diffraction cells,
all edge lines of one diffraction cell among the plurality of diffraction cells included in the second hologram element are located on extensions of edge lines of adjacent diffraction cells adjacent to the one diffraction cell, the adjacent diffraction cells being included in the plurality of diffraction cells included in the second hologram element,
the first hologram element is an emission-side hologram element,
the second hologram element comprises two second hologram elements which are an entrance-side hologram element and a deflecting hologram element,
the entrance-side hologram element is positioned to cause light that has entered from an outside to an inside of the light guide plate to propagate in the inside of the light guide plate by deflection through diffraction,
the deflecting hologram element is positioned to cause the light deflected by the entrance-side hologram element to propagate in the inside of the light guide plate by deflection through diffraction, and
the emission-side hologram element is positioned to cause the light deflected by the deflecting hologram element to be emitted to the outside of the light guide plate by deflection through diffraction.

2. The light guide plate according to claim 1, wherein each of the plurality of diffraction cells included in the first hologram element is in a shape of a polygon and is positioned to share an edge line with an adjacent diffraction cell adjacent to the diffraction cell, the adjacent diffraction cell being included in the plurality of diffraction cells.

3. The light guide plate according to claim 2, wherein each of the plurality of diffraction cells included in the first hologram element is in a shape of a regular hexagon.

4. The light guide plate according to claim 2, wherein each of the plurality of diffraction cells included in the first hologram element is in a shape of a square.

5. The light guide plate according to claim 2, wherein each of the plurality of diffraction cells included in the first hologram element is in a shape of an equilateral triangle.

6. The light guide plate according to claim 1, wherein each of the plurality of diffraction cells included in the second hologram element is in a shape of a square and is positioned to share an edge line with an adjacent diffraction cell adjacent to the diffraction cell, the adjacent diffraction cell being included in the plurality of diffraction cells included in the second hologram element.

7. A display device comprising:
the light guide plate according to claim 1; and
an image generating device that generates light showing an image, and causes the light to enter the light guide plate.

* * * * *